US007698332B2

(12) United States Patent
Liu et al.

(10) Patent No.: US 7,698,332 B2
(45) Date of Patent: Apr. 13, 2010

(54) PROJECTING QUERIES AND IMAGES INTO A SIMILARITY SPACE

(75) Inventors: Tie-Yan Liu, Beijing (CN); Tao Qin, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 280 days.

(21) Appl. No.: 11/375,528

(22) Filed: Mar. 13, 2006

(65) Prior Publication Data

US 2007/0214114 A1    Sep. 13, 2007

(51) Int. Cl.
 G06F 7/00    (2006.01)
 G06F 17/30    (2006.01)
(52) U.S. Cl. .................... 707/728; 707/999.003
(58) Field of Classification Search ............ None
 See application file for complete search history.

(56) References Cited

U.S. PATENT DOCUMENTS

| | | | | |
|---|---|---|---|---|
| 5,987,457 | A * | 11/1999 | Ballard | 707/5 |
| 6,189,002 | B1 * | 2/2001 | Roitblat | 707/1 |
| 6,411,953 | B1 * | 6/2002 | Ganapathy et al. | 707/6 |
| 6,917,952 | B1 * | 7/2005 | Dailey et al. | 707/203 |
| 6,993,189 | B2 * | 1/2006 | Jojic et al. | 382/197 |
| 7,260,568 | B2 * | 8/2007 | Zhang et al. | 707/3 |
| 7,296,009 | B1 * | 11/2007 | Jiang et al. | 707/3 |
| 2002/0002899 | A1 * | 1/2002 | Gjerdingen et al. | 84/667 |
| 2002/0161747 | A1 * | 10/2002 | Li et al. | 707/3 |
| 2004/0162827 | A1 * | 8/2004 | Nakano | 707/6 |

OTHER PUBLICATIONS

Jeon et al., "Automatic Image Annotation and Retrieval using Cross-Media Relevance Models", 2003, ACM, pp. 119-126.*
Si et al., "Using Sampled Data and Regression to Merge Search Engine Results", 2002, ACM, pp. 19-26.*
Santini et al., "Integrated Browsing and Querying for Image Databases," IEEE, 2000.*
Smith et al., "VisualSEEk: a fully automated content-based image query system," ACM, 1996.*
Altavista image, 1 page, http://www.altavista.com/imaqes, Copyright 2006 Overture Services, Inc. [last accessed Aug. 10, 2006].
Baeza-Yates, Ricardo and Berthier Ribeiro-Neto, "Chapter 2 Modeling," Modern Information Retrieval, Pearson—Addison Wesley, © 1999 by the ACM Press, 63 pages.

(Continued)

*Primary Examiner*—Pierre M Vital
*Assistant Examiner*—Rachel J Lee
(74) *Attorney, Agent, or Firm*—Perkins Coie LLP

(57) ABSTRACT

A method and system for projecting queries and images into a similarity space where queries are close to their relevant images is provided. A similarity space projection ("SSP") system learns a query projection function and an image projection function based on training data. The query projection function projects the relevance of the most relevant words of a query into a similarity space and the image projection function projects the relevance to an image of the most relevant words of a query into the same similarity space so that queries and their relevant images are close in the similarity space. The SSP system can then identify images that are relevant to a target query and queries that are relevant to a target image using the projection functions.

15 Claims, 10 Drawing Sheets

OTHER PUBLICATIONS

Barnard, Kobus et al., "Matching Words and Pictures," Feb. 2003, Journal of Machine Learning Research, vol. 3, 2003, pp. 1107-1135.

Beitzel, Steven M. et al., "Hourly Analysis of a Very Large Topically Categorized Web Query Log," SIGIR'04, Jul. 2004, UK, © 2004 ACM, pp. 321-328.

Cai, Deng et al., "Hierarchical Clustering of WWW Image Search Results Using Visual, Textual and Link Information," MM'04, Oct. 2004, New York, © 2004 ACM, 8 pages.

Ditto, 1 page, http://ditto.com, [last accessed Aug. 10, 2006].

Feng, Huamin, Rui Shi and Tat-Seng Chua, "A Bootstrapping Framework for Annotating and Retrieving WWW Images," MM'04, Oct. 2004, New York, © 2004 ACM, pp. 960-967.

Frankel, Charles, Michael J. Swain and Vassilis Athitsos, "WebSeer: An Image Search Engine for the World Wide Web," Aug. 1, 1996, University of Chicago Technical Report 96-14, pp. 1-24.

Google Image Search, Copyright 2006 Google, 1 page, http://images.google.com [last accessed Aug. 10, 2006].

Google, Zeitgeist: Search patterns, trends, and surprises, Copyright 2006 Google, 1 page, http://www.google.com/press/zeitgeist.html.

He, Jingrui, Changshui Zhang, Nanyuan Zhao and Hanghang Tong, "Boosting Web Image Search by Co-Ranking," ICASSP 2005, © 2005 IEEE, pp. 11-409-11-412.

Huang, Jing et al., "Image Indexing Using Color Correlograms," 1997, pp. 1-7.

Kearns, Michael and Dana Ron, "Algorithmic Stability and Sanity-Check Bounds for Leave-One-Out Cross-Validation," 1999, 26 pages.

Lei, Zhang, Lin Fuzong and Zhang Bo, "A CBIR Method Based on Color-Spatial Feature," 1999, 4 pages.

Lin, Wei-Hao, Rong Jin and Alexander Hauptmann, "Web Image Retrieval Re-Ranking with Relevance Model," Proceedings of the IEEE/WIC International Conference on Web Intelligence (WI'03), © 2003 IEEE, 7 pages.

Lu, Ye, Chunhui Hu, Xingquan Zhu, HongJiang Zhang and Qiang Yang, "A Unified Framework for Semantics and Feature Based Relevance Feedback in Image Retrieval Systems," ACM Multimedia 2000, Los Angeles, CA, © 2000 ACM, pp. 31-37.

PicSearch, Copyright 2006 PicSearch, 1 page, http://www.picsearch.com, [last accessed Aug. 14, 2006].

Sclaroff, Stan, Marco La Cascia and Saratendu Sethi, "Unifying Textual and Visual Cues for Content-Based Image Retrieval on the World Wide Web," Computer Vision and Image Understanding, vol. 75, Nos. 1/2, Jul./Aug. 1999, © 1999 by Academic Press, pp. 86-98.

Singhal, Amit, "Modern Information Retrieval: A Brief Overview," Bulletin of the IEEE Computer Society Technical Committee on Data Engineering, © 2001 IEEE, pp. 1-9.

Smith, John R. and Shih-Fu Chang, "Visually Searching the Web for Content," IEEE MultiMedia, Jul.-Sep. 1997, © 1997 IEEE, pp. 12-20.

Thao, Cheng and Ethan V. Munson, "A Relevance Model for Web Image Search," Aug. 3, 2003, WDA 2003, United Kingdom, pp. 57-60.

Tsymbalenko, Yelena and Ethan V. Munson, "Using HTML Metadata to Find Relevant Images on the World Wide Web," Jan. 9, 2001, pp. 1-9.

Yahoo Image Search, Copyright 2006 Yahoo!, 1 page, http://images.yahoo.com [last accessed Aug. 10, 2006].

Yanai, Keiji, "Image Collector II: An Over-One-Thousand-Images-Gathering System," WWW 2003, Budapest, Hungary, 4 pages.

Yanai, Keiji, "Web Image Mining toward Generic Image Recognition," WWW, May 2003, 4 pages.

Yu, Hui, Mingjing Li, Hong-Jiang Zhang and Jufu Feng, "Color Texture Moments for Content-Based Image Retrieval," Sep. 2002, 4 pages.

\* cited by examiner

PROJECTING QUERIES AND IMAGES INTO A SIMILARITY SPACE

BACKGROUND

Many search engine services, such as Google and Overture, provide for searching for information that is accessible via the Internet. These search engine services allow users to search for display pages, such as web pages, that may be of interest to users. After a user submits a search request (also referred to as a "query") that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of base web pages to identify all web pages that are accessible through those base web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how related the information of the web page may be to the search request. The search engine service then displays to the user links to those web pages in an order that is based on their relevance.

Several search engine services also provide for searching for images that are available on the Internet. These image search engines typically generate a mapping of keywords to images by crawling the web in much the same way as described above for mapping keywords to web pages. An image search engine service can identify keywords based on text of the web pages that contain the images. An image search engine may also gather keywords from metadata associated with images of web-based image forums, which are an increasingly popular mechanism for people to publish their photographs and other images.

Regardless of how the mappings are generated, an image search engine service inputs an image query and uses the mapping to find images that are related to the image query. An image search engine service may identify thousands of images that are related to an image query and presents thumbnails of the related images. To help a user view the images, an image search engine service may order the thumbnails based on relevance of the images to the image query. Unfortunately, the relevance determination may not be particularly accurate because image queries may be ambiguous (e.g., "tiger" may represent the animal or the golfer), the keywords derived from web pages may not be very related to an image of the web page (e.g., a web page can contain many unrelated images), and so on.

SUMMARY

A method and system for projecting queries and images into a similarity space where queries are close to their relevant images is provided. A similarity space projection ("SSP") system learns a query projection function and an image projection function based on training data. The training data includes queries represented by query features, images represented by image features, and an indication of the relevance of the images to the queries. Each query feature and image feature indicates the words that are related to the query or image. The SSP system identifies the words of each query that are most relevant to the query and represents them as a most-relevant query feature. The SSP system identifies a query-specific image feature for each combination of a query and an image. A query-specific image feature for a query/image combination contains an element for each of the most relevant words of the query with its value set to the value of the corresponding word in the image feature. After generating the query-specific image features, the SSP system generates a query projection function that maps the most-relevant query feature of each query to a similarity space and an image projection function that maps the query-specific image feature of each query/image combination to the similarity space such that queries are close to their relevant images in the similarity space. After the query projection function and the image projection function are generated, the SSP system can identify images that are relevant to a target query and queries that are relevant to a target image using the projection functions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
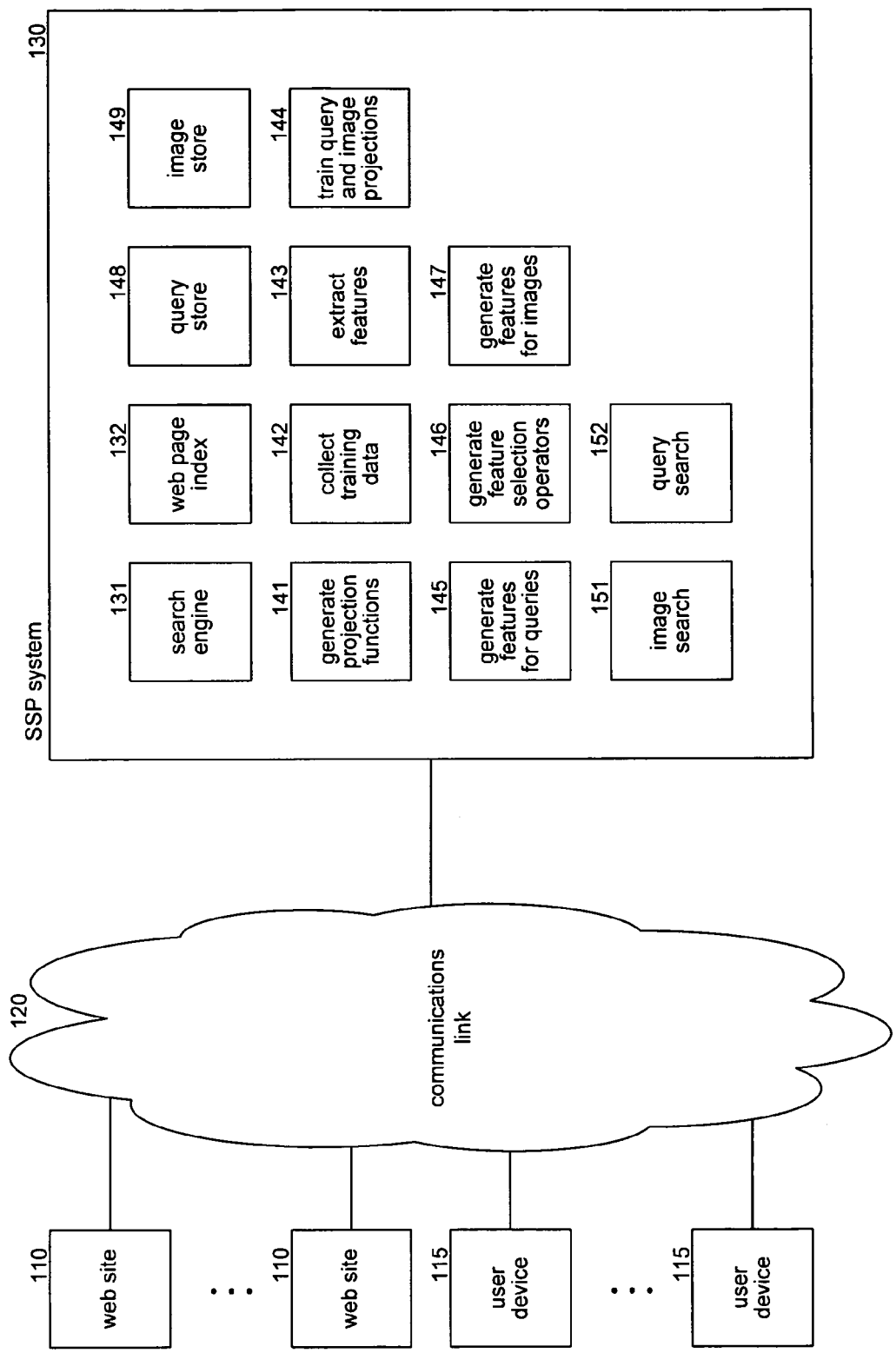
FIG. 1 is a block diagram that illustrates components of the SSP system in one embodiment.

A method and system for projecting queries and images into a similarity space where queries are close to their relevant images is provided. In one embodiment, a similarity space projection ("SSP") system learns a query projection function and an image projection function that project queries and images into the same similarity space. The SSP system learns the projection functions based on training data that specifies the relevance of images to queries. The projection functions ensure that in the similarity space queries and their relevant images are close to each other. The SSP system can then use the projection functions to search for images that are relevant to a target query. The SSP system uses the projection functions to project the target query and the images into the similarity space. The SSP system then selects the images that are closest to the target query in the similarity space as being the images that are most relevant to the target query.

In one embodiment, the SSP system learns the projection functions using training data that includes queries represented by query features, images represented by image features, and an indication of the relevance of the images to the queries. Each query feature and image feature indicates the words that are related to the query or image. The features may have an element for each word in a collection of words with the value of an element indicating the relevance of the word to the query or image. A zero value may indicate that the word is not relevant, and a large value may indicate that the word is highly relevant. For example, if there are 10,000 words in the collection, then each query feature and image feature is represented by a 10,000-element vector with most elements having a zero value. For example, an image of a red tulip may have non-zero values for the elements corresponding to the words "red," "tulip," "flower," "bulb," and so on. An image of the sun may have non-zero values for the elements corresponding to the words "sun," "sunshine," "yellow," "weather," and so on. The SSP system identifies the words of each query that are most relevant to the query and represents them as a most-relevant query feature. For example, the query "yellow tulip" may have as its most relevant words "yellow," "tulip," "flower," "bulb," "sunshine," and so on. The query "current weather" may have as its most relevant words "current," "weather," "sunshine," "rain," and so on. The SSP system then identifies a query-specific image feature for each combination of a query and an image. A query-specific image feature for a query/image combination contains an element for each of the most relevant words of the query with its value set to the value of the corresponding word in the image feature. For example, if the query of the combination is "yellow tulip," then the query-specific image feature contains elements for the words "yellow," "tulip," "flower," "bulb," "sunshine," and so on. If the image of the combination is of a red tulip, then the values of the elements of the query-specific image feature may be (0, 0.7, 0.6, 0.4, 0.1) corresponding to the most relevant words of the query (i.e., yellow, tulip, flower, bulb, sunshine). If the image of the combination is of the sun, then the values of the elements of the query-specific image feature may be (0.5, 0, 0, 0, 0.7). After generating the query-specific image features, the SSP system generates a query projection function that maps the most-relevant query feature of each query to a similarity space and an image projection function that maps the query-specific image feature of each query/image combination to the similarity space such that queries are close to their relevant images in the similarity space.

After the query projection function and the image projection function are generated, the SSP system can identify images that are relevant to a target query. The SSP system generates a most-relevant query feature for the target query and then generates a query-specific image feature for each combination of the target query and an image. The SSP system then uses the query projection function to map the most-relevant query feature for the target query to the similarity space and uses the image projection function to map each query-specific image feature to the similarity space. The SSP system then identifies the images that are close to the target query in the similarity space. The SSP system provides those identified images as the search result of the target query.

The SSP system can also use the query projection function and the image projection function to identify queries that are relevant to a target image. These queries may serve as annotations to the target image. The SSP system may receive keywords along with the target image. For example, the keywords may have been collected from text surrounding the image. The SSP system generates an image feature for the target image where the elements corresponding to the keywords have a non-zero value. The SSP system then generates a query-specific image feature for each query and target image combination. The SSP system then maps the query-specific image features to the similarity space using the image projection function. The SSP system also maps the most-relevant query features of the queries to the similarity space using the query projection function, which need only be performed once, since the mapping is independent of the target image. The SSP system then identifies the queries that are close to the target image in the similarity space. The SSP system provides those identified queries as the search result of the target image, which may be used to annotate the target image.

The SSP system may generate the query projection function and the image projection function using a set of m images and n queries that are represented by features. The SSP system can generate a global vocabulary or collection of words containing $N_0$ words, $D=\{D_1, \ldots, D_{N_0}\}$, which includes all the words related to the n queries and all the words related to the m images. The SSP system generates a query feature for each query i, which can be represented as $q_i^0 \in R^{N_0}$, i=1, ..., n. The SSP also generates an image feature for each image i, which can be represented as $x_i^t \in R^{N_0}$, i=1, ..., m. The superscript t means that the feature is based on text. As discussed below, the SSP system may represent images using both textual and visual features (e.g., a color histogram). The SSP system then performs "feature selection" to select those words closely related to a query/image combination for its query-specific image feature. For each query i, the SSP system may create a "feature selection" operator, $T^{(i)}$, i=1, ..., n, where $T^{(i)}$ is a $k*N_0$ matrix, where k represents the number of elements of the most-relevant query feature, and where each row contains only one element with the value 1 (corresponding to a most-relevant word to the query) and the rest with the value 0. The SSP system can represent the most-relevant query feature as follows:

$$q_i = T^{(i)} q_i^0 \quad (1)$$

Each image has n query-specific image features—one for each query. The SSP system generates the query-specific image features using "feature selection" as follows:

$$x_{ij}^t = T^{(i)} x_j^t \quad (2)$$

where $x_{ij}^t$ represents the query-specific image feature for query i and image j and $x_j^t$ represents the image feature for image j. A combined feature may include a query-specific image feature (i.e., a textual feature) and visual feature for an image and is represented as follows:

$$x_{ij} = \begin{bmatrix} x_{ij}^t \\ x_j^v \end{bmatrix}, i = 1, \ldots, n; j = 1, \ldots, m \quad (3)$$

where $x_{ij}^t$ represents the textual feature of image j for query i and $x_j^v$ represents the visual feature of image j.

In one embodiment, the SSP system learns a query projection function and an image projection function so that images relevant to a query are close to the query in the similarity space and so that images not relevant to a query are not close to the query in the similarity space. The SSP system learns the projection function using training data including n queries $q_1, q_2, \ldots, q_n$. For each query $q_i$, the training data include a query-specific image feature $x_{ij}^r$ for the relevant image j and a query-specific image feature $x_{ij}^o$ for the irrelevant image j. The SSP system uses a Euclidean distance to measure the distance between images and queries in the similarity space. The SSP system represents the projection of image $x_{ij}^r$ in the similarity space as $f(x_{ij}^r)$ and the projection of query $q_i$ in the similarity space as $g(q_i)$. The SSP system represents the distance between the projected image $x_{ij}^r$ and the projected query $q_i$ as follows:

$$\sqrt{[f(x_{ij}^r) - g(q_i)]^T [f(x_{ij}^r) - g(q_i)]} \tag{4}$$

The SSP system learns the operators f and g by minimizing the distance between queries and their relevant images and maximizing the distance between queries and non-relevant images. The SSP system represents the total of the distances (actually the square of the distances) between a query and its relevant images as follows:

$$D_i^{(relevant)} = \sum_j [f(x_{ij}^r) - g(q_i)]^T [f(x_{ij}^r) - g(q_i)] \tag{5}$$

where i represents the query and j represents the images. The SSP system represents the total of the distances between a query and its non-relevant images as follows:

$$D_i^{(irrelevant)} = \sum_j [f(x_{ij}^o) - g(q_i)]^T [f(x_{ij}^o) - g(q_i)] \tag{6}$$

The SSP system generates the query projection function and the image projection function with the goal of minimizing $D_i^{(relevant)}$ and maximizing $D_i^{(irrelevant)}$ at the same time. The SSP system represents the objective function for query i as follows:

$$J_i(f, g) = \frac{D_i^{(relevant)}}{D_i^{(irrelevant)}} \tag{7}$$

Thus, the SSP system represents the overall objective function for all the queries as follows:

$$\min J(f, g) = \min \sum_i J_i(f, g) \tag{8}$$

$$= \min \sum_i \frac{\sum_j [f(x_{ij}^r) - g(q_i)]^T [f(x_{ij}^r) - g(q_i)]}{\sum_j [f(x_{ij}^o) - g(q_i)]^T [f(x_{ij}^o) - g(q_i)]}$$

Although the $f$ and g functions can be linear or nonlinear functions, the SSP system in one embodiment uses linear functions A and B and the overall object function can be represented as follows:

$$\min J(A, B) = \min \sum_i J_i(A, B) \tag{9}$$

$$= \min \sum_i \frac{\sum_j (Ax_{ij}^r - Bq_i)^T (Ax_{ij}^r - Bq_i)}{\sum_j (Ax_{ij}^o - Bq_i)^T (Ax_{ij}^o - Bq_i)}$$

The SSP system may find a solution for the objective function using a gradient descent technique. The gradient descent technique alternates between the determination of the descent directions ΔA and ΔB, and the selection of the step sizes $t_1$ and $t_2$. The SSP system obtains the descent directions ΔA and ΔB as follows:

$$\Delta A = -\frac{\partial J}{\partial A} \tag{10}$$

$$= -2 \sum_i \frac{\left[\sum_j (Ax_{ij}^r - Bq_i)[x_{ij}^r]^T\right]\left[\sum_j (Ax_{ij}^o - Bq_i)^T (Ax_{ij}^o - Bq_i)\right]}{\left[\sum_j (Ax_{ij}^o - Bq_i)^T (Ax_{ij}^o - Bq_i)\right]^2} +$$

$$2 \sum_i \frac{\left[\sum_j (Ax_{ij}^o - Bq_i)[x_{ij}^o]^T\right]\left[\sum_j (Ax_{ij}^r - Bq_i)^T (Ax_{ij}^r - Bq_i)\right]}{\left[\sum_j (Ax_{ij}^o - Bq_i)^T (Ax_{ij}^o - Bq_i)\right]^2}$$

$$\Delta B = -\frac{\partial J}{\partial B} \tag{11}$$

$$= 2 \sum_i \frac{\left[\sum_j (Bq_i - Ax_{ij}^r) q_i^T\right]\left[\sum_j (Ax_{ij}^o - Bq_i)^T (Ax_{ij}^o - Bq_i)\right]}{\left[\sum_j (Ax_{ij}^o - Bq_i)^T (Ax_{ij}^o - Bq_i)\right]^2} -$$

$$\sum_i \frac{\left[\sum_j (Bq_i - Ax_{ij}^o) q_i^T\right]\left[\sum_j (Ax_{ij}^r - Bq_i)^T (Ax_{ij}^r - Bq_i)\right]}{\left[\sum_j (Ax_{ij}^o - Bq_i)^T (Ax_{ij}^o - Bq_i)\right]^2}$$

The SSP system may initialize matrices A and B using a pseudo-identity matrix. In particular, if A is a k*m matrix (k≤n), then the SSP system sets A=[I O$_1$], in which I is a k*k identity matrix and O$_1$ is a k*(m-k) zero matrix. Similarly, if B is a k*n matrix (k≤n), then the SSP system sets B=[I O$_2$] with I being a k*k identity matrix and O$_2$ being a k*(n-k) zero matrix. The SSP system may use a termination criterion for the solution as follows:

$$\|\Delta A\| \leq \epsilon, \|\Delta B\| \leq \epsilon \tag{12}$$

where $\epsilon$ is a small constant such as 0.001.

In one embodiment, the SSP system automatically generates the training data from a set of training queries. The SSP system submits each training query to a conventional search engine and receives the search results. For each query, the SSP system identifies the words of the search results that are related to the query. In addition, the SSP system identifies images in the search results and extracts related words for each image from the text surrounding the images. The SSP system may also input from a user an indication of the relevance of each image to each query.

The SSP system generates the query feature for a query from the words of the query and the related words of the search result. The SSP system generates the most relevant query feature to have k words representing the p words of the query and the (k-p) most relevant words of the search result. The k words form a set $W_i\{w_{i1}, w_{i2}, \ldots, w_{ik}\}$, where $w_{i1}$ may be a number from 1 to $N_0$ identifying a word of the vocabulary. The SSP system represents the most-relevant query feature as a k-dimensional feature vector $q_i = \{q_{i1}, q_{i2}, \ldots q_{ik}\}$. The SSP system sets the value of each element corresponding to a word of the query to the inverse of the number of words of the query in the feature (e.g., 1/p. The SSP system also sets the value of each other element to its number of occurrences divided by the total number of occurrences of the most relevant words. The SSP system represents the values as follows:

$$q_{ij} = \begin{cases} 1/p, & j \leq p \\ \dfrac{c_j}{\sum_{l=p+1}^{k} c_l}, & \text{else} \end{cases} \quad (13)$$

where $c_l$ is the number of occurrence of the $(l-p)_{th}$ most relevant word in the search result query $q_i$ and $$\dfrac{c_j}{\sum_{l=p+1}^{k} c_l}$$

is a normalized frequency.

The SSP system generates the image feature of an image by setting the value of each element to the count of that word in the text surrounding the image. The SSP system may also augment an image feature with a visual feature. The SSP system may add a 64-dimension visual image feature to the textual image feature. The visual image feature may be a combination of a 44-dimension banded auto-correlogram, a six-dimension color moment feature in LUV color space, and a 14-dimension color texture moment. The auto-correlogram is described in Zhang, L., Lin F., and Zhang B., "A CBIR Method Based on Color-Spatial Feature," TENCON '99, pp. 166-169, 1999, which is hereby incorporated by reference. The color texture moment is described in Yu, H., Li, M., Zhang, H., and Feng, J., "Color Texture Moments for Content-Based Image Retrieval," ICIP, September 2002, which is hereby incorporated by reference. The SSP system may use a color quantization technique as described in Huang, J., Kumar, S., Mitra, M., Zhu, W., and Zabith, R., "Image Indexing Using Color Correlograms," IEEE Conf. on Computer Vision and Pattern Recognition, pp. 762-765, 1997.

FIG. 1 is a block diagram that illustrates components of the SSP system in one embodiment. The SSP system 130 is connected to web sites 110 and user computing devices 115 via communications link 120. The SSP system includes a conventional search engine component 131 and a web page index 132. The web page index may be created using a conventional crawler that crawls the web sites to identify web pages and generate an index of keywords to web pages. The search engine component receives a query and identifies relevant web pages using the web page index. The SSP system also includes a generate projection functions component 141 and a collect training data component 142. The generate projection functions component generates the query projection function and the image projection function based on training data. The collect training data component collects training data for learning the projection functions. The collect training data component inputs the queries of a query store 148, submits those queries to the search engine component, and stores the search results. The collect training data component identifies the images from the search result, excluding mages that appear to be advertisements, and stores the identified images in the image store 149. The generate projection functions component invokes an extract features component 143 to extract the most-relevant query features and the query-specific image features. The generate projection function component then invokes a train query and image projections component 144 to learn the projection functions. The extract features component invokes a generate features for queries component 145, a generate feature selection operators component 146, and a generate features for images component 147. After the query and image projection functions are learned, the SSP system may invoke an image search component 151 to search for images that are related to a target query or may invoke a query search component 152 to identify queries related to a target image.

The computing devices on which the SSP system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the SSP system. In addition, the data structures and message structures may be stored or transmitted via a data transmission medium, such as a signal on a communications link. Various communications links may be used, such as the Internet, a local area network, a wide area network, or a point-to-point dial-up connection.

The SSP system may be used to search for images or annotate images as implemented on various computing systems or devices including personal computers, server computers, multiprocessor systems, microprocessor-based systems, minicomputers, mainframe computers, distributed computing environments that include any of the above systems or devices, and the like. The SSP system may also provide its services to various computing systems such as personal computers, cell phones, personal digital assistants, consumer electronics, home automation devices, and so on.

The SSP system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the user interface component may be implemented on a server separate from the computer system that generates the quality scores and collects the images.

Figure 2:
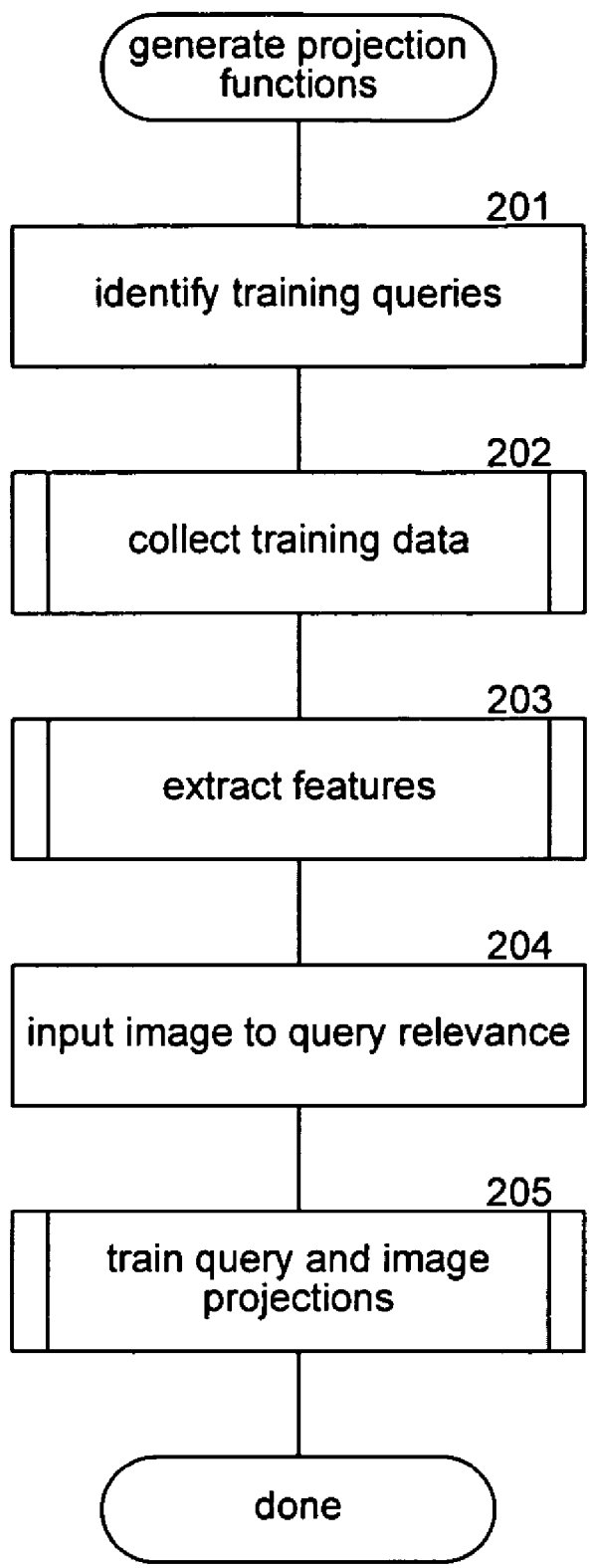
FIG. 2 is a flow diagram that illustrates the processing of the generate projection functions component of the SSP system in one embodiment.

FIG. 2 is a flow diagram that illustrates the processing of the generate projection functions component of the SSP system in one embodiment. The component generates a query projection function and an image projection function using training queries. In block 201, the component identifies the training queries. In block 202, the component invokes the collect training data component to collect training data corresponding to the training queries. In block 203, the component invokes an extract features component to extract the most-relevant query features for the queries of the training data and the query-specific image features for the images of the training data. In block 204, the component inputs an image-to-query relevance from a user indicating the relevance of each image to each query. In block 205, the component invokes the train query and image projections component to learn the projection functions and then completes.

Figure 3:
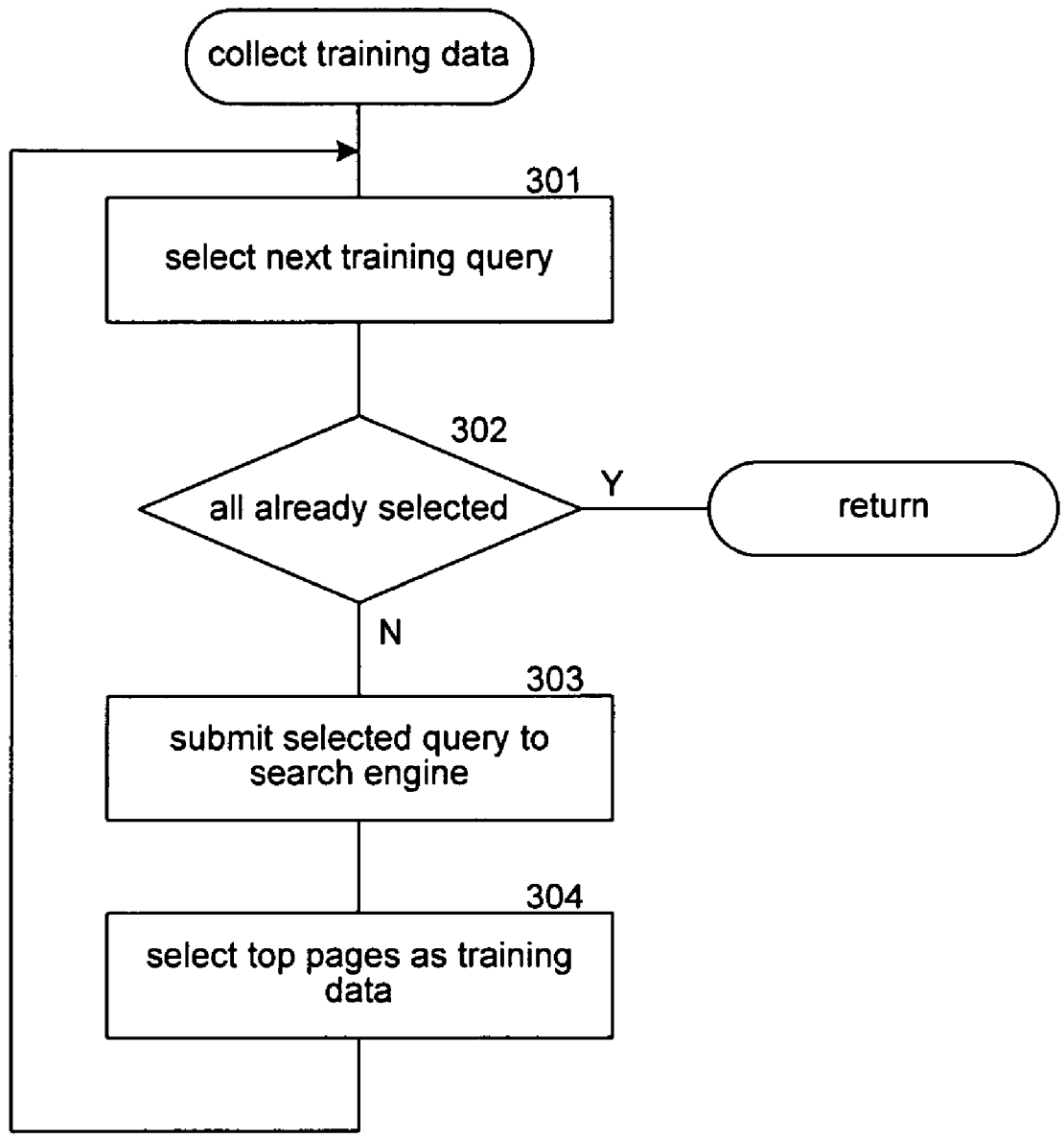
FIG. 3 is a flow diagram that illustrates the processing of the collect training data component of the SSP system in one embodiment.

FIG. 3 is a flow diagram that illustrates the processing of the collect training data component of the SSP system in one embodiment. The component collects the training data for the training queries. In block 301, the component selects the next training query. In decision block 302, if all the training queries have already been selected, then the component returns, else the component continues at block 303. In block 303, the components submits the selected query to a conventional search engine. In block 304, the component selects the top pages of the search result as training data and then loops to block 301 to select the next training query.

Figure 4:
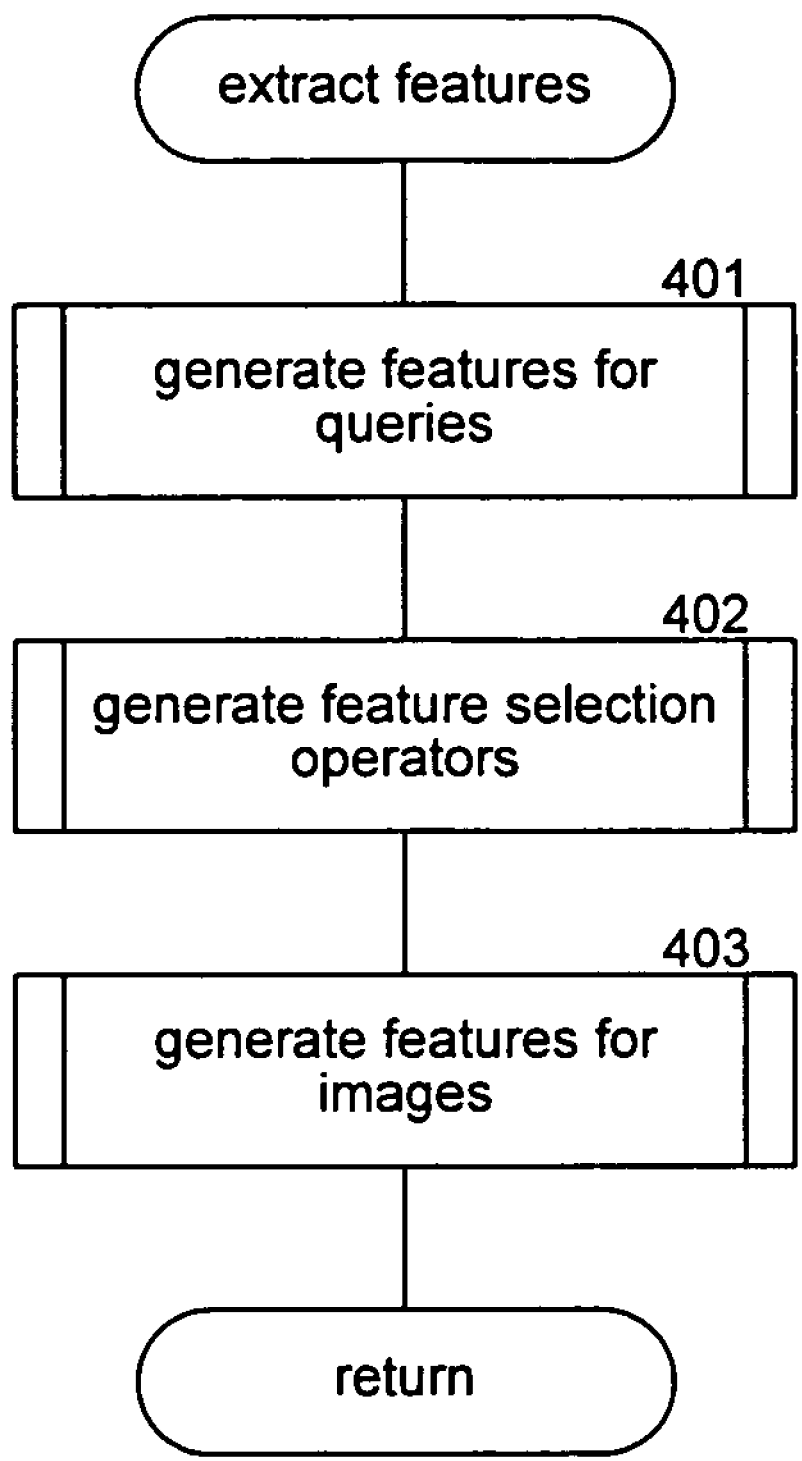
FIG. 4 is a flow diagram that illustrates the processing of the extract features component of the SSP system in one embodiment.

FIG. 4 is a flow diagram that illustrates the processing of the extract features component of the SSP system in one embodiment. The component extracts the most-relevant query features and the query-specific image features. In block 401, the component invokes the generate features for queries component. In block 402, the component invokes the generate feature selection operators component. In block 403, the component invokes the generate features for images component and then returns.

Figure 5:
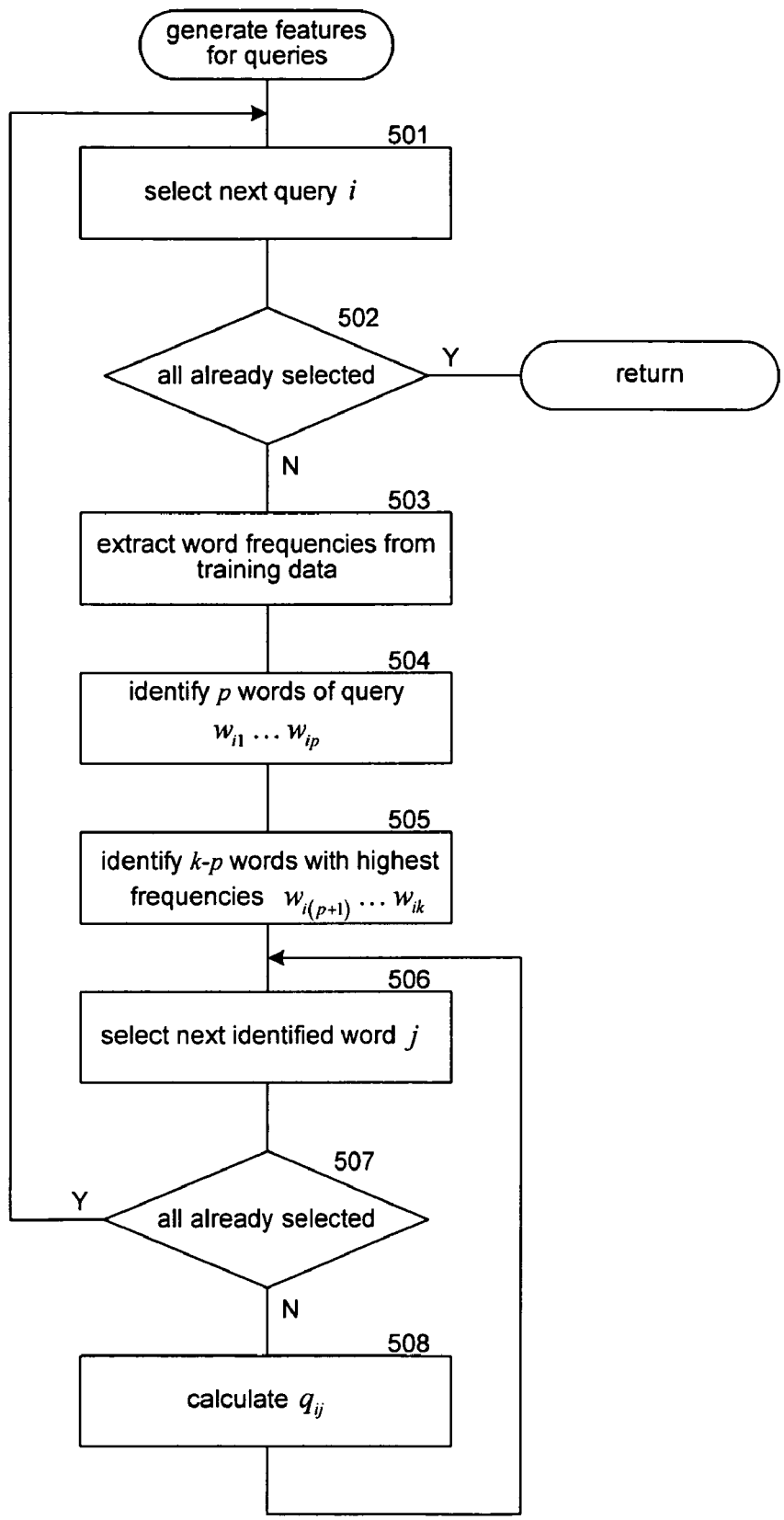
FIG. 5 is a flow diagram that illustrates the processing of the generate features for queries component of the SSP system in one embodiment.

FIG. 5 is a flow diagram that illustrates the processing of the generate features for queries component of the SSP system in one embodiment. The component loops selecting each query and generating the query features and the most-relevant query features for each query. In block 501, the component selects the next query. In decision block 502, if all the queries have already been selected, then the component returns, else the component continues at block 503. In block 503, the component determines the word frequencies for the words (e.g., non-noise words) related to the query from the web pages of the search result for the selected query. In block 504, the component identifies the words of the query to be included in the most-relevant query feature such as all the non-noise words. In block 505, the component identifies the words with the highest frequencies. In blocks 506-508, the component loops calculating the values for the elements of the most-relevant query feature. In block 506, the component selects the next identified word. In decision block 507, if all the words have already been selected, then the component loops to block 501 to select the next query, else the component continues at block 508. In block 508, the component calculates the value for the selected word for the selected query and then loops to block 506 to select the next word for the selected query.

Figure 6:
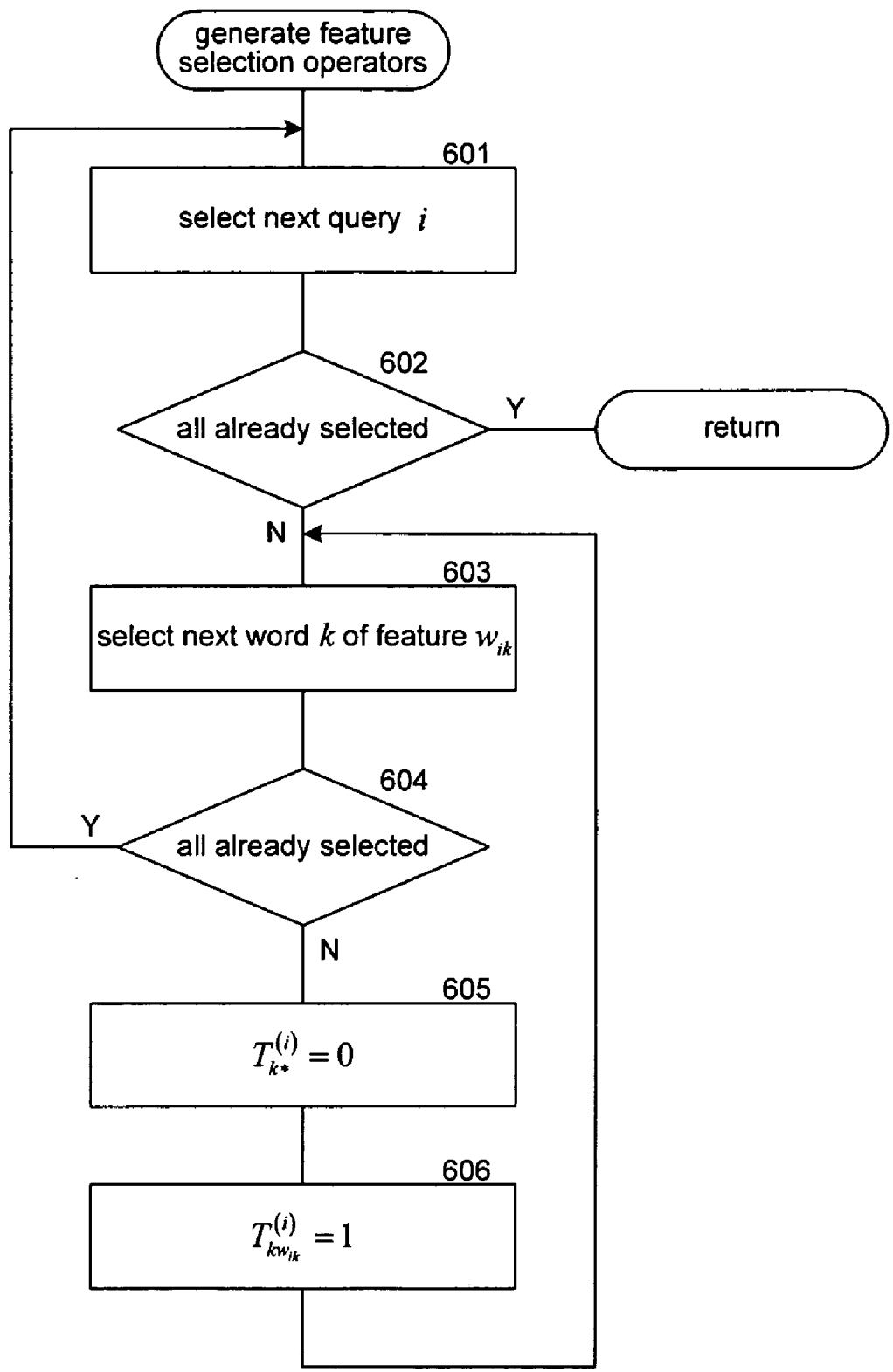
FIG. 6 is a flow diagram that illustrates the processing of the generate feature selection operators component of the SSP system in one embodiment.

FIG. 6 is a flow diagram that illustrates the processing of the generate feature selection operators component of the SSP system in one embodiment. The component generates feature selection operators for each query based on the most-relevant query features. In block 601, the component selects the next query. In decision block 602, if all the queries have already been selected, then the component returns, else the component continues at block 603. In block 603, the component selects the next word of the most-relevant query feature for the selected query. In decision block 604, if all the words have already been selected, then the component loops to block 601 to select the next query, else the component continues at block 605. In block 605, the component sets all the elements of the feature selection operator for the selected word to the value 0. In block 606, the component sets the single element of the feature selection operator for the selected query for the selected word that corresponds to the selected word to the value of 1. The component then loops to block 603 to select the next word.

Figure 7:
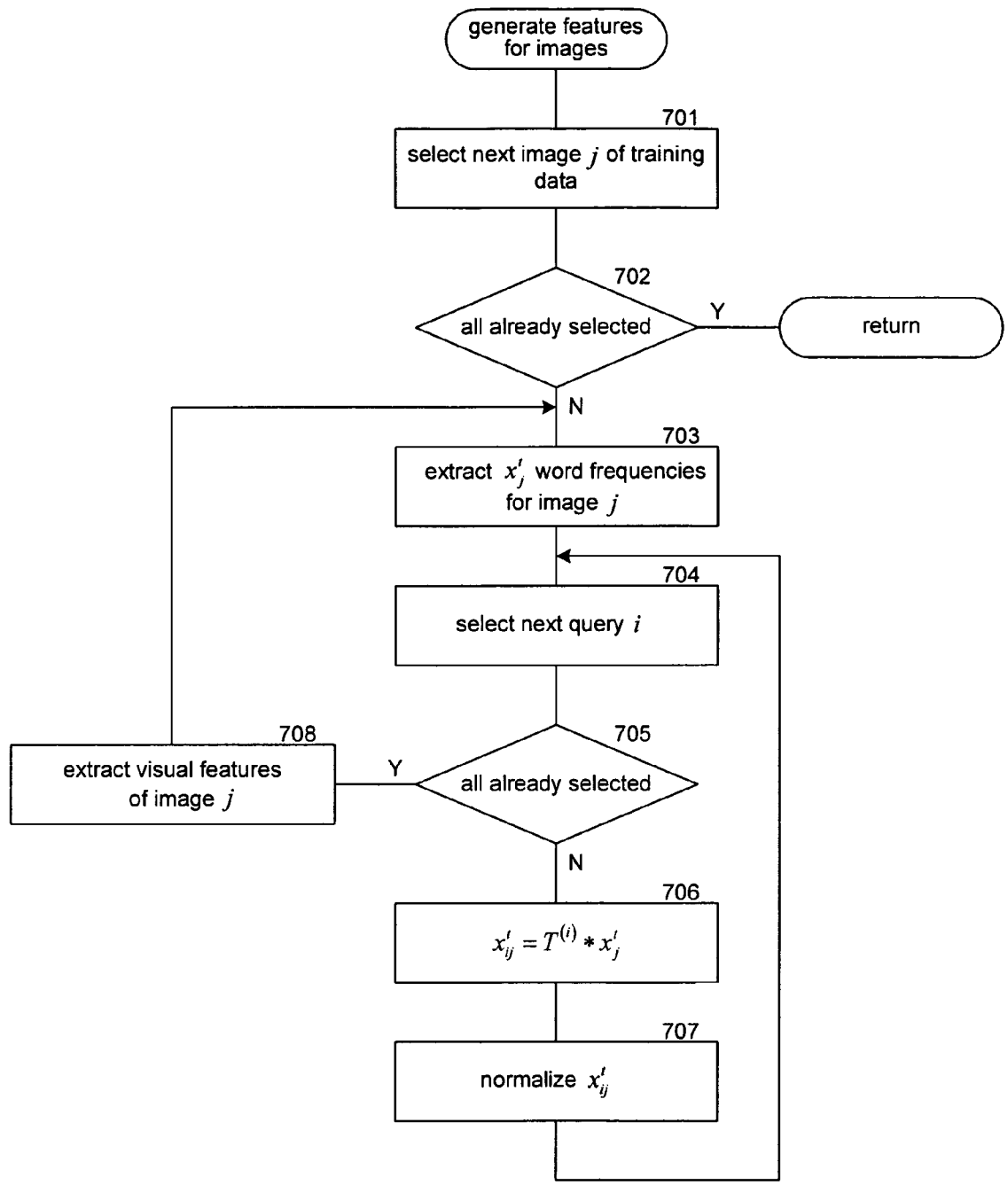
FIG. 7 is a flow diagram that illustrates the processing of the generate features for images component of the SSP system in one embodiment.

FIG. 7 is a flow diagram that illustrates the processing of the generate features for images component of the SSP system in one embodiment. The component loops generating a query-specific image feature for each query and image combination. In block 701, the component selects the next image of the training data. In decision block 702, if all the images have already been selected, then the component returns, else the component continues at block 703. In block 703, the component extracts the word frequencies of the text surrounding the selected image to generate an image feature for the selected image. In blocks 704-707, the component loops generating the query-specific image feature for each combination of a query and the selected image. In block 704, the component selects the next query. In decision block 705, if all the queries have already been selected, then the component continues at block 708, else the component continues at block 706. In block 706, the component applies the feature selection operator for the selected query to the image feature of the selected image to generate the query-specific image feature for the selected query and selected image combination. In block 707, the component normalizes the query-specific image feature and then loops to block 704 to select the next query. In block 708, the component extracts the visual features of the selected image and loops to block 701 to select the next image.

Figure 8:
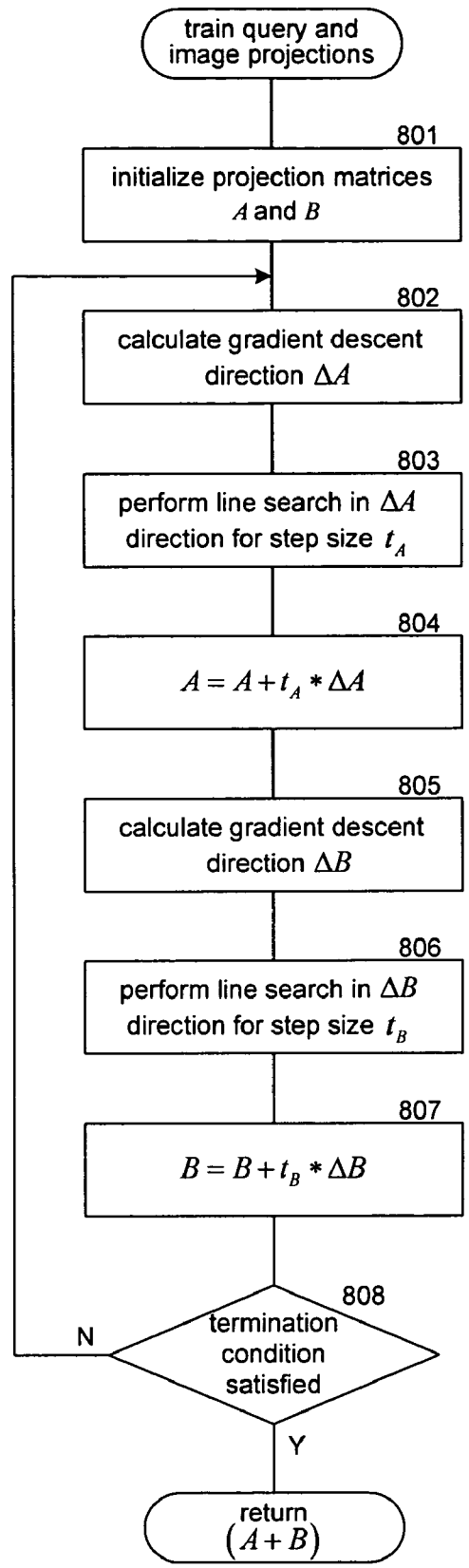
FIG. 8 is a flow diagram that illustrates the processing of the train query and image projections component of the SSP system in one embodiment.

FIG. 8 is a flow diagram that illustrates the processing of the train query and image projections component of the SSP system in one embodiment. In block 801, the component initializes the projection matrices. In blocks 802-808, the component loops searching for a solution for the projection functions. In block 802, the component calculates the gradient descent direction for the matrix A. In block 803, the component performs a line search in the gradient descent direction to identify a step size. In block 804, the component calculates a new matrix A based on the step size and gradient descent direction. In block 805, the component calculates a gradient descent direction for the matrix B. In block 806, the component performs a line search in the gradient descent direction to identify a step size. In block 807, the component calculates a new matrix B based on the step size and gradient descent direction. In decision block 808, if a termination condition is satisfied, then the component returns the matrices A and B as the query projection function and the image projection function, else the component loops to block 801 to continue searching for a solution. A termination condition may be satisfied when the step sizes are less than a certain value.

Figure 9:
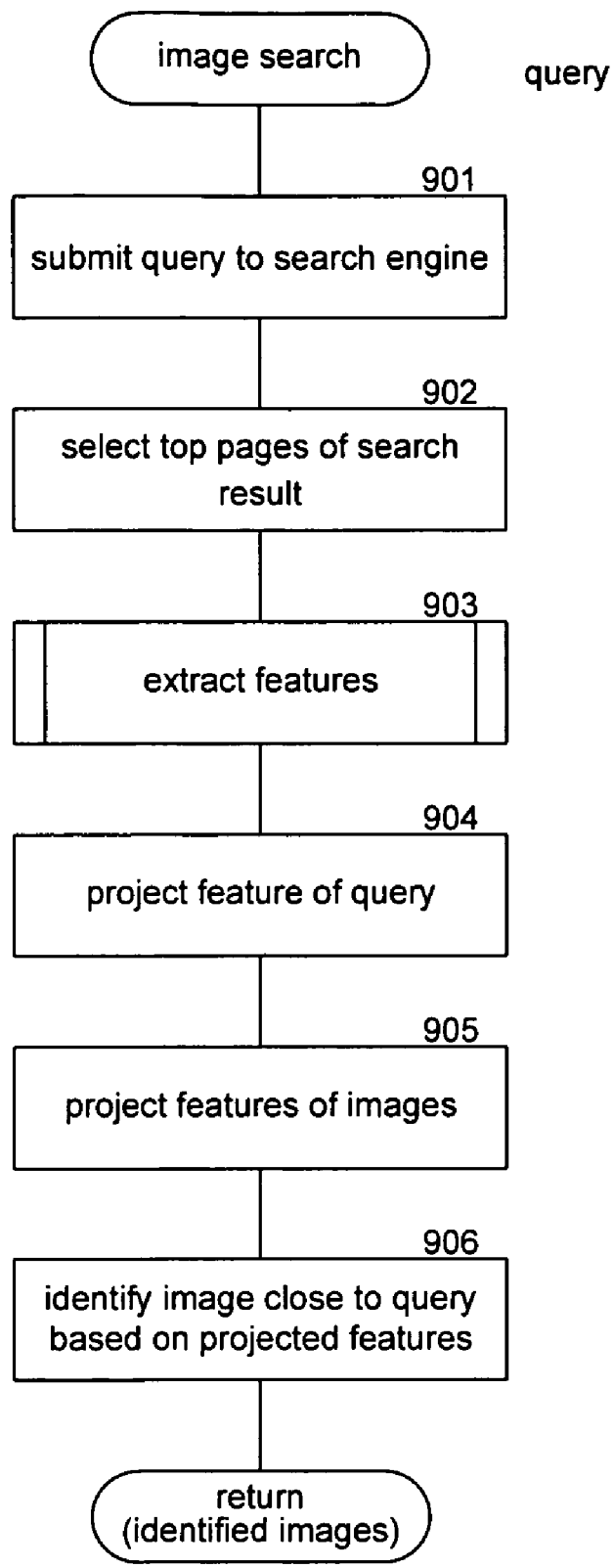
FIG. 9 is a flow diagram of the image search component of the SSP system in one embodiment.

FIG. 9 is a flow diagram of the image search component of the SSP system in one embodiment. The component is passed a target query and identifies images that are related to the target query. In block 901, the components submits the target query to a conventional search engine. In block 902, the component selects the top pages of the search result. In block 903, the component invokes the extract features component to generate the most-relevant query feature for the target query and the query-specific image features for combinations of the target query and each image. In block 904, the component uses the query projection function to project the most-relevant query feature. In block 905, the component uses the image projection function to project the query-specific image features. In block 906, the component identifies the images that are closest to the query in the similarity space. The component then returns the identified images.

Figure 10:
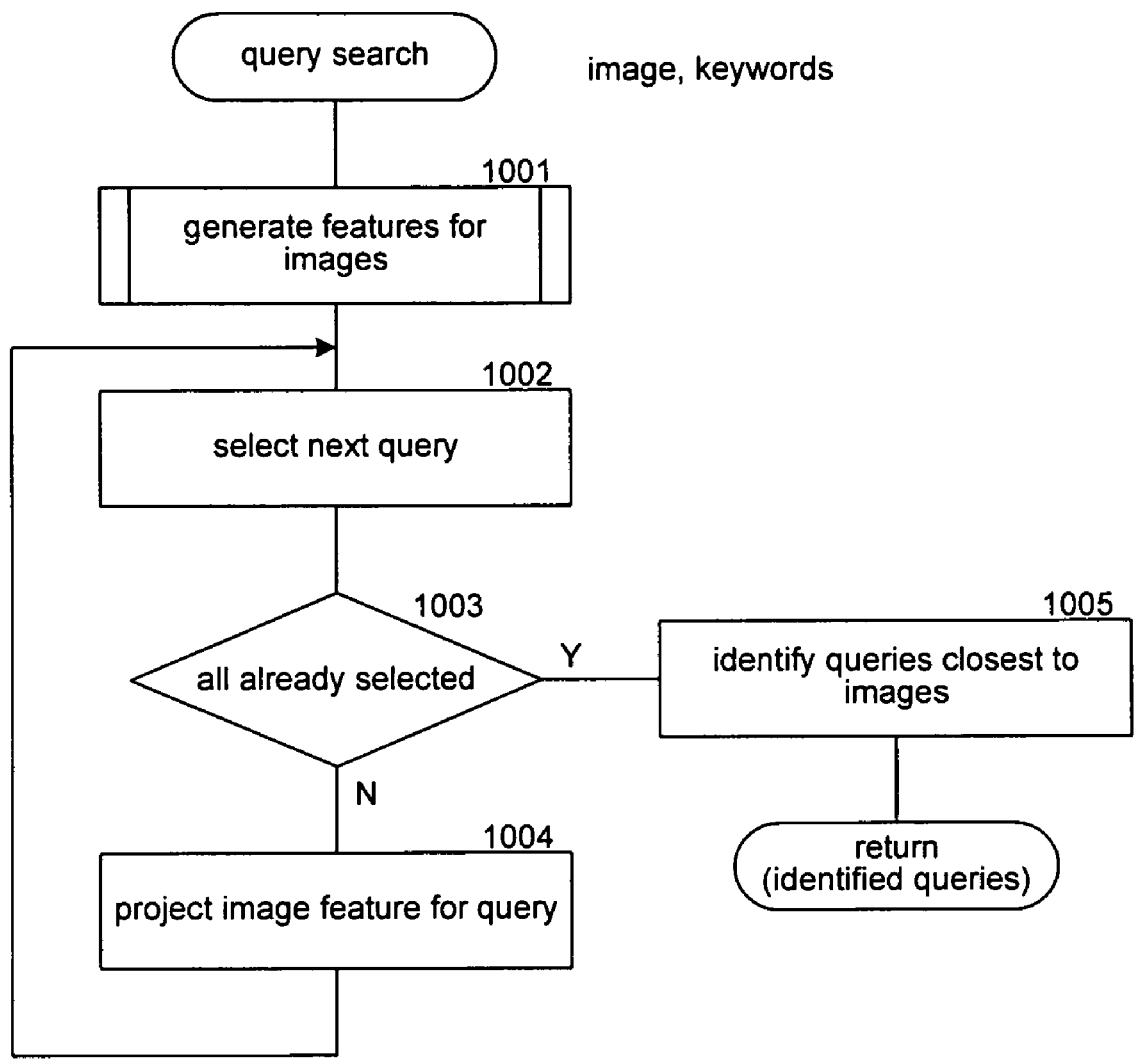
FIG. 10 is a flow diagram that illustrates the processing of the query search component of the SSP system in one embodiment.

FIG. 10 is a flow diagram that illustrates the processing of the query search component of the SSP system in one embodiment. The component is passed a target image and keywords and searches for queries that are related to the image. In block 1001, the component invokes the generate features for images component to generate query-specific image features for the target image using the feature selection operators of the queries. In block 1002, the component selects the next query. In decision block 1003, if all the queries have already been selected, then the component continues at block 1005, else the component continues at block 1004. In block 1004, the component projects the query-specific image feature for the selected query to the similarity space and then loops to block 1002 to select the next query. In block 1005, the component identifies the queries that are closest to the image in the similarity space and then returns the identified queries.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computing system with a central processing unit and memory for projecting images and queries into a similarity space, comprising:
 a data store that provides queries and images as training data and relevance of the images to the queries, the queries and images having associated words, the words being from a collection of words;
 a relevance extraction component that,
  for each image, identifies an image relevance for the most relevant words to the image, the image relevance represented by a most-relevant image feature having non-zero scores for each of the words of the collection that are most relevant to the image and having a score of zero for each of the other words of the collection; and
  for each query,
   identifies a query relevance for the most relevant words to the query, the query relevance represented by a most-relevant query feature having non-zero scores for each of the words of the collection that are most relevant to the query and a score of zero for each of the other words of the collection; and
   for each image, identifies a query-specific image relevance that is specific to the query, the query-specific image relevance represented by a query-specific image feature having scores indicating relevance of the image to each of those most relevant words of the query and having scores of zero for each of the other words of the collection, the query-specific image feature being generated by:
    for each of the most-relevant words to the query as indicated by a non-zero score in the most-relevant query feature,
     extracting the score for that most-relevant word from the most-relevant image feature for the image; and
     setting the score for that most-relevant word in the query-specific image feature to the extracted score; and
    setting the score for the other words of the query-specific image feature to zero;
   so that each combination of a query and an image has a query-specific image feature that includes, for each of the most relevant words of the query, the relevance score for that most relevant word from the image feature;
 a learn projection component that learns a projection of the most-relevant query features to a similarity space and a projection of the query-specific image features to the similarity space so that in the similarity space distances between queries and their relevant images are smaller than distances between queries and their non-relevant images; and
 a search component that identifies the most relevant words of a target query and their query relevance to the target query represented by a most-relevant query feature; for each image, identifies image relevance to the image of the identified most-relevant words represented by a query-specific image feature; projects the most-relevant query feature and the query-specific image feature; and selects images with projected query-specific image features whose distances from the projected most-relevant query feature in the similarity space are smallest as being relevant to the query.

2. The system of claim 1 wherein the relevance extraction component includes:
 a query feature extraction component that for each query identifies the most relevant words to the query and generates the most-relevant query feature that contains the relevance of the most relevant words to the query;
 a feature selection component that for each query generates a feature selection operator for selecting the relevance of the most relevant words to the images; and
 an image feature extraction component that for each image generates an image feature that contains the relevance of each word to the image and for each query and image combination uses the feature selection operator for the query to generate the query-specific image feature for the combination.

3. The system of claim 1 wherein the learn projection component uses a gradient descent optimization technique to minimize a distance in the similarity space between queries and their relevant images and to maximize a distance in similarity space between queries and their non-relevant images.

4. The system of claim 3 wherein the technique alternates between determination of gradient descent direction for a query projection and an image projection.

5. The system of claim 1 including an annotation component that
 provides the image relevance of a target image to words;
 for each query, identifies the image relevance of the most relevant words to the target image;
 projects the image relevance of the target image into the similarity space; and
 selects queries that are close to the image as being relevant to the target image.

6. The system of claim 5 wherein an annotation for the target image is generated from the selected queries.

7. The system of claim 1 wherein the image relevances represent textual features that are augmented with visual features for learning an image projection function that is based on textual and visual features.

8. The system of claim 1 including a data collection component that submits queries of the training data to a search engine and identifies images and words from the search results of the queries.

9. A method performed by computing system with a central processing unit and memory for projecting images and queries into a similarity space, comprising:
 providing a data store that stores queries and images as training data and relevance of the images to the queries, the queries and images having associated words, the words being from a collection of words;
 extracting by the processor relevance of images by:
  for each image, identifying an image relevance for the most relevant words to the image, the image relevance represented by a most-relevant image feature having a score indicating relevance of a word to the image for each of the words of the collection that are most relevant to the image and having a score indicating that a word is not relevant to the image for each of the other words of the collection; and for each query,
- identifying a query relevance for the most relevant words to the query, the query relevance represented by a most-relevant query feature having a score indicating relevance of a word to the query for each of the words of the collection that are most relevant to the query and a score indicating that a word is not relevant to the query for each of the other words of the collection; and
- for each image, identifying a query-specific image relevance that is specific to the query, the query-specific image relevance represented by a query-specific image feature having scores indicating relevance of the image to each of those most relevant words of the query and having scores indicating that a word is not relevant to the image for each of the other words of the collection, the query-specific image feature being generated by:
  - for each of the most-relevant words to the query as indicated by a score in the most-relevant query feature,
    - extracting the score for that most-relevant word from the most-relevant image feature for the image; and
    - setting the score for that most-relevant word in the query-specific image feature to the extracted score; and
  - setting the score for the other words of the query-specific image feature to indicate no relevance;

so that each combination of a query and an image has a query-specific image feature that includes, for each of the most relevant words of the query, the score for that most relevant word from the image feature;

learning by the processor a projection of the most-relevant query features to a similarity space and a projection of the query-specific image features to the similarity space so that in the similarity space distances between queries and their relevant images are smaller than distances between queries and their non-relevant images; and searching by the processor by:
- identifying the most relevant words of a target query and their query relevance to the target query represented by a most-relevant query feature;
- for each image, identifying image relevance to the image of the identified most-relevant words represented by a query-specific image feature;
- projecting the most-relevant query feature and the query-specific image feature; and
- selecting images with projected query-specific image features whose distances from the projected most-relevant query feature in the similarity space are smallest as being relevant to the query.

10. The method of claim 9 wherein the learning of a projection uses a gradient descent optimization technique to minimize a distance in the similarity space between queries and their relevant images and to maximize a distance in similarity space between queries and their non-relevant images.

11. The method of claim 10 wherein the technique alternates between determination of gradient descent direction for a query projection and an image projection.

12. The method of claim 9 including:
- providing the image relevance of a target image to words;
- for each query, identifying the image relevance of the most relevant words to the target image;
- projecting the image relevance of the target image into the similarity space; and
- selecting queries that are close to the image as being relevant to the target image.

13. The method of claim 12 wherein an annotation for the target image is generated from the selected queries.

14. The method of claim 9 wherein the image relevances represent textual features that are augmented with visual features for learning an image projection function that is based on textual and visual features.

15. The method of claim 9 including submitting queries of the training data to a search engine and identifying images and words from the search results of the queries.

* * * * *